United States Patent [19]

Pidcoe et al.

[11] Patent Number: 5,228,351

[45] Date of Patent: Jul. 20, 1993

[54] ARRANGEMENT FOR MEASURING THE FIELD ANGLE OF A MAGNETIC FIELD AS A FUNCTION OF AXIAL POSITION WITHIN A MAGNET BORE TUBE

[75] Inventors: Stephen V. Pidcoe, Bonita, Calif.; Roger A. Zink, Desoto, Tex.; William N. Boroski, Aurora; William R. McCaw, Burr Ridge, both of Ill.

[73] Assignee: General Dynamics Corporation, Space Systems Div., San Diego, Calif.

[21] Appl. No.: 777,826

[22] Filed: Oct. 15, 1991

[51] Int. Cl.$^5$ ............................................. G01N 29/04
[52] U.S. Cl. .................................................. 73/865.8
[58] Field of Search ............................ 73/865.8, 866.5; 92/172; 324/220; 33/302, 755, 756, 758–760; 378/60

[56] References Cited

U.S. PATENT DOCUMENTS

| | | | |
|---|---|---|---|
| 3,793,732 | 2/1974 | Hamrick | 33/760 |
| 4,195,529 | 4/1980 | Madoian et al. | 324/220 |
| 4,372,161 | 2/1983 | de Buda et al. | 73/866.5 |
| 4,848,168 | 7/1989 | Negishi | 73/865.8 |
| 4,945,775 | 8/1990 | Adams et al. | 73/865.8 |

FOREIGN PATENT DOCUMENTS 0214739  8/1989  Japan ......................................  378/60

Primary Examiner—Robert Raevis
Attorney, Agent, or Firm—Frank D. Gilliam; John R. Duncan

[57] ABSTRACT

An arrangement for measuring the field angle of a magnetic field as a function of axial position within a magnet bore tube of a magnet such as is used with the Superconducting Super Collider (SSC). The arrangement includes a magnetic field alignment gauge that is carried through the magnet bore tube by a positioning shuttle in predetermined increments. The positioning shuttle includes an extensible body assembly which is actuated by an internal piston arrangement. A pair of spaced inflatable cuffs are carried by the body assembly and are selectively actuated in cooperation with pressurizing of the piston to selectively drive the positioning shuttle in an axial direction. Control of the shuttle is provided by programmed electronic computer means located exteriorly of the bore tube and which controls valves provided pressurized fluid to the inflatable cuss and the piston arrangement.

19 Claims, 4 Drawing Sheets

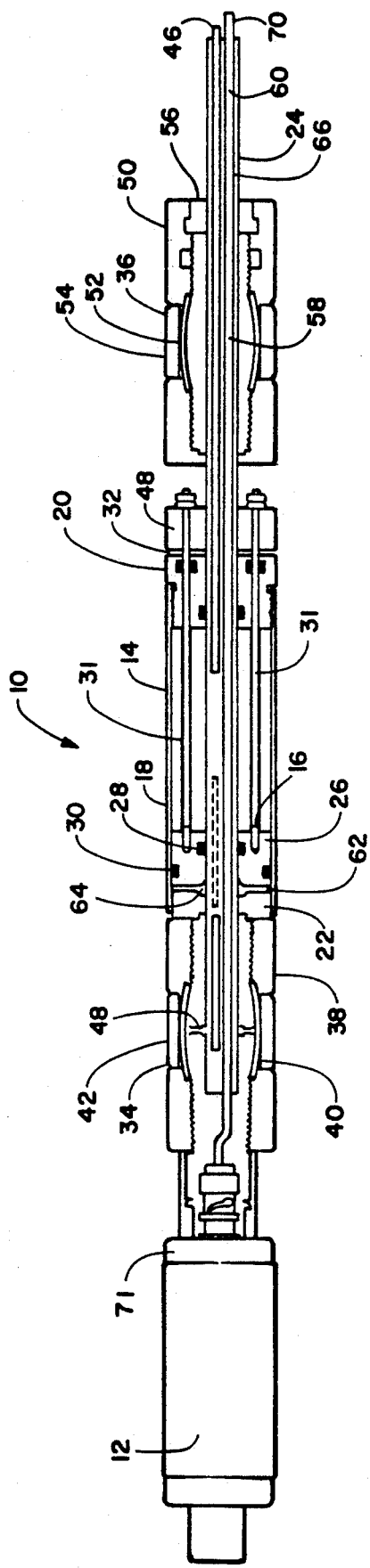
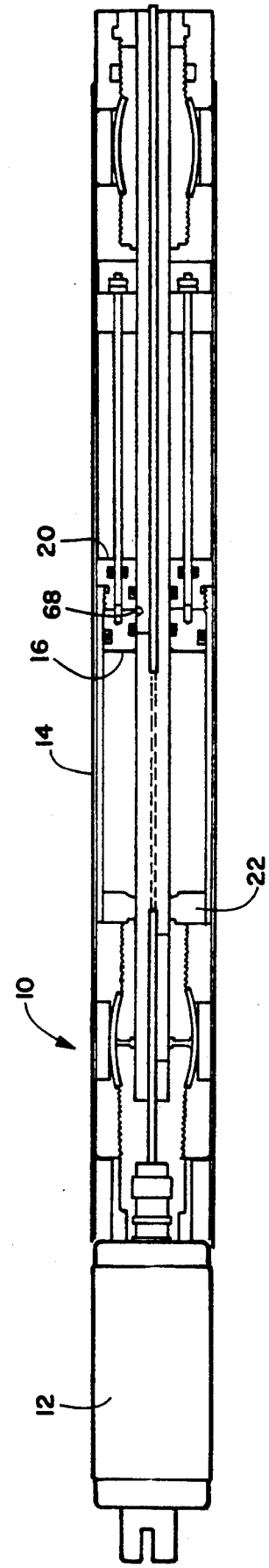
FIGURE 1
FIGURE 2

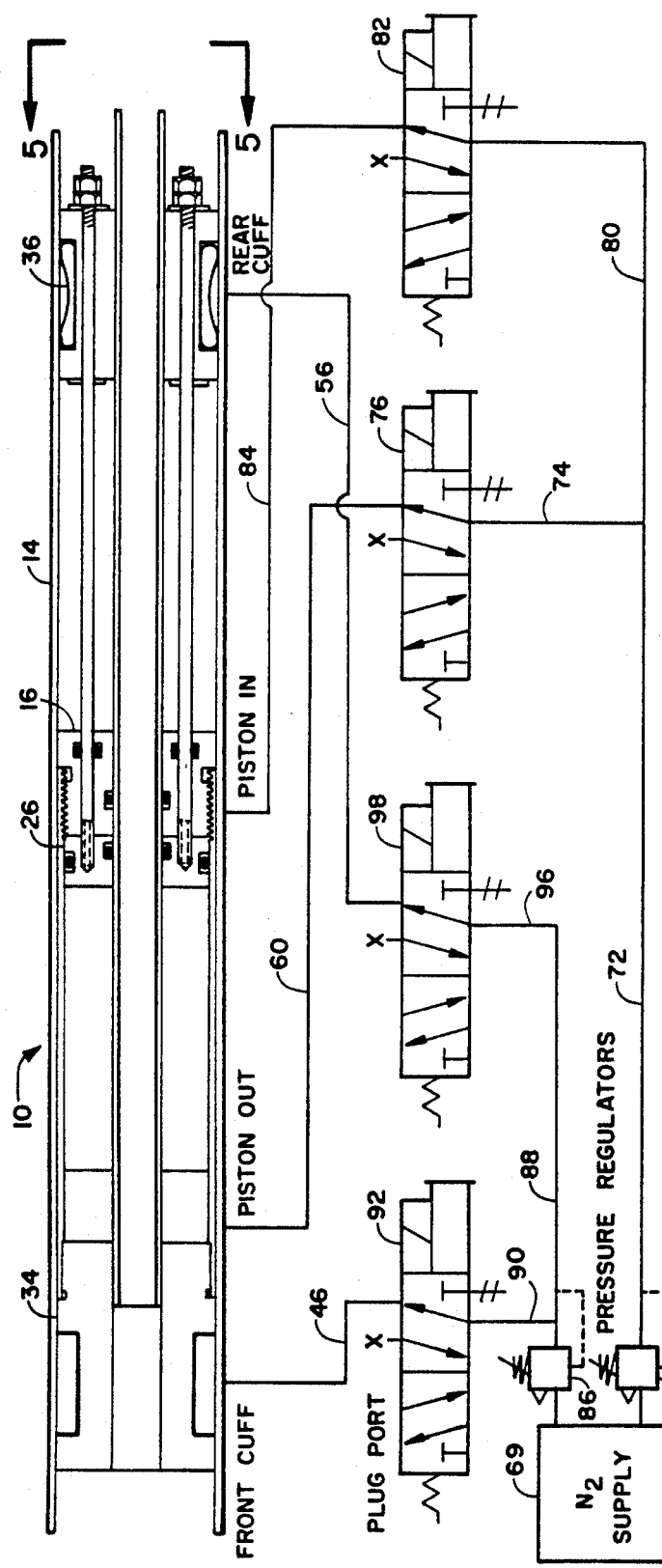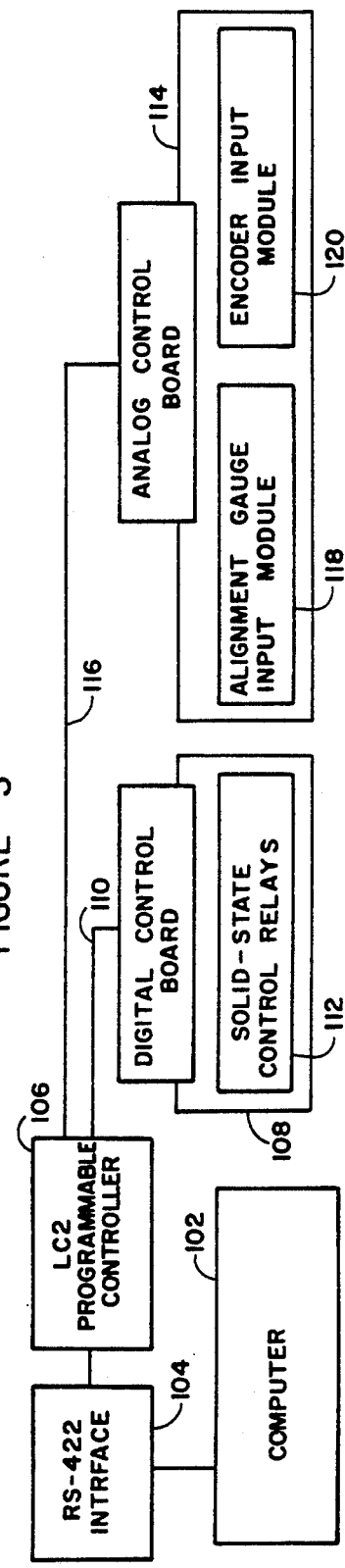
FIGURE 3
FIGURE 4

ARRANGEMENT FOR MEASURING THE FIELD ANGLE OF A MAGNETIC FIELD AS A FUNCTION OF AXIAL POSITION WITHIN A MAGNET BORE TUBE

BACKGROUND OF THE INVENTION

1. Field of the Invention

The present invention relates generally to an improvement in the art of measuring the field angle of a magnetic field as a function of axial position within a magnet bore tube and more particularly, but not by way of limitation, to an arrangement utilizing a self propelled shuttle to carry a magnetic field probe through a magnet bore tube in predetermined advancements.

2. Description of the Prior Art

An alignment gauge is used to measure the magnetic field angle as a function of axial position in each of the magnets for the Superconducting Super Collider (SSC). Present measurements are made by manually pushing the magnetic field alignment gauge through the length of each bore tube with long aluminum rods. Gauge location is controlled through graduation marks and alignment pins on the push rods. Measurements of the field direction were taken at three inch intervals as the gauge travelled the length of the beam tube. Graduation marks placed on the aluminum rods provided the means of determining the gauge axial position. Critical to the accuracy of the measurements is the ability to maintain the gauge deviation from horizontal to ± five degrees at each position along the magnet length. Alignment pins in the aluminum rods permitted angular control by an operator at the end of the magnet bore tube. A logging multimeter with tape output provided the voltage measurements for each measurement location. Exact axial positioning of the gauge was recorded by the gauge operator during the measurements. Data processing and plotting was accomplished by manually entering voltage measurements and axial probe positions into a computer after the measurements were completed. The procedure was labor intensive and involved several personnel to perform each measurement. Obviously, a need exists for an improved arrangement for measuring the field angle as a function of axial position in each of the cold iron magnets for the SSC. It is believed that the present invention provides a substantial improvement over the previously known arrangements for accomplishing this task.

SUMMARY OF THE INVENTION

Briefly stated, the present invention provides an improved arrangement for measuring the field angle of a magnetic field as a function of axial position within a magnet bore tube of a dipole magnet such as is seen in the SSC. The arrangement includes a magnetic field alignment gauge that is carried through the magnetic bore tube by a positioning shuttle in predetermined increments. The positioning shuttle includes an extensible body assembly which is actuated by an internal piston arrangement. A pair of spaced inflatable cuff means are carried by the shuttle for the purpose of temporarily locking a portion of the extensible body assembly in a predetermined position and are selectively actuated in cooperation with the actuation of the piston arrangement to selectively drive the positioning shuttle in a predetermined axial direction. Pressurized fluid is supplied to the piston assembly and to the inflatable cuff means under the control of a plurality of electronically controlled valves. Control of the shuttle within the bore tube is provided by programmed electronic computer means located exteriorly of the bore tube and which control the valves providing pressurized fluid to the inflatable cuffs and the piston assembly. The shuttle then moves the gauge along the beam tube length in predetermined increments and the magnetic field alignment gauge simultaneously measures the field alignment with respect to the vertical. The axial and rotational alignment of the gauge is monitored and recorded as the gauge proceeds, with field measurements being read directly into the computer for immediate processing.

The above and other specific features of the instant invention will be readily apparent as the description continues while being read in conjunction with the appended drawings.

BRIEF DESCRIPTION OF THE DRAWINGS

FIG. 1 is a partial sectional of the positioning in-tube shuttle of the present invention together with the associated magnetic field probe;

FIG. 2 is another sectional of the in-tube shuttle shown in FIG. 1 which illustrates the traverse of the shuttle within the beam tube;

FIG. 3 is a schematic illustrating the fluid pressure control system for the shuttle of FIG. 1;

FIG. 4 is a block diagram illustrating the electronic computer system that controls the fluid pressure control system of FIG. 3 and which records the data acquired by the magnetic field probe carried by the shuttle.

DETAILED DESCRIPTION OF THE PREFERRED EMBODIMENT

Figure 5:
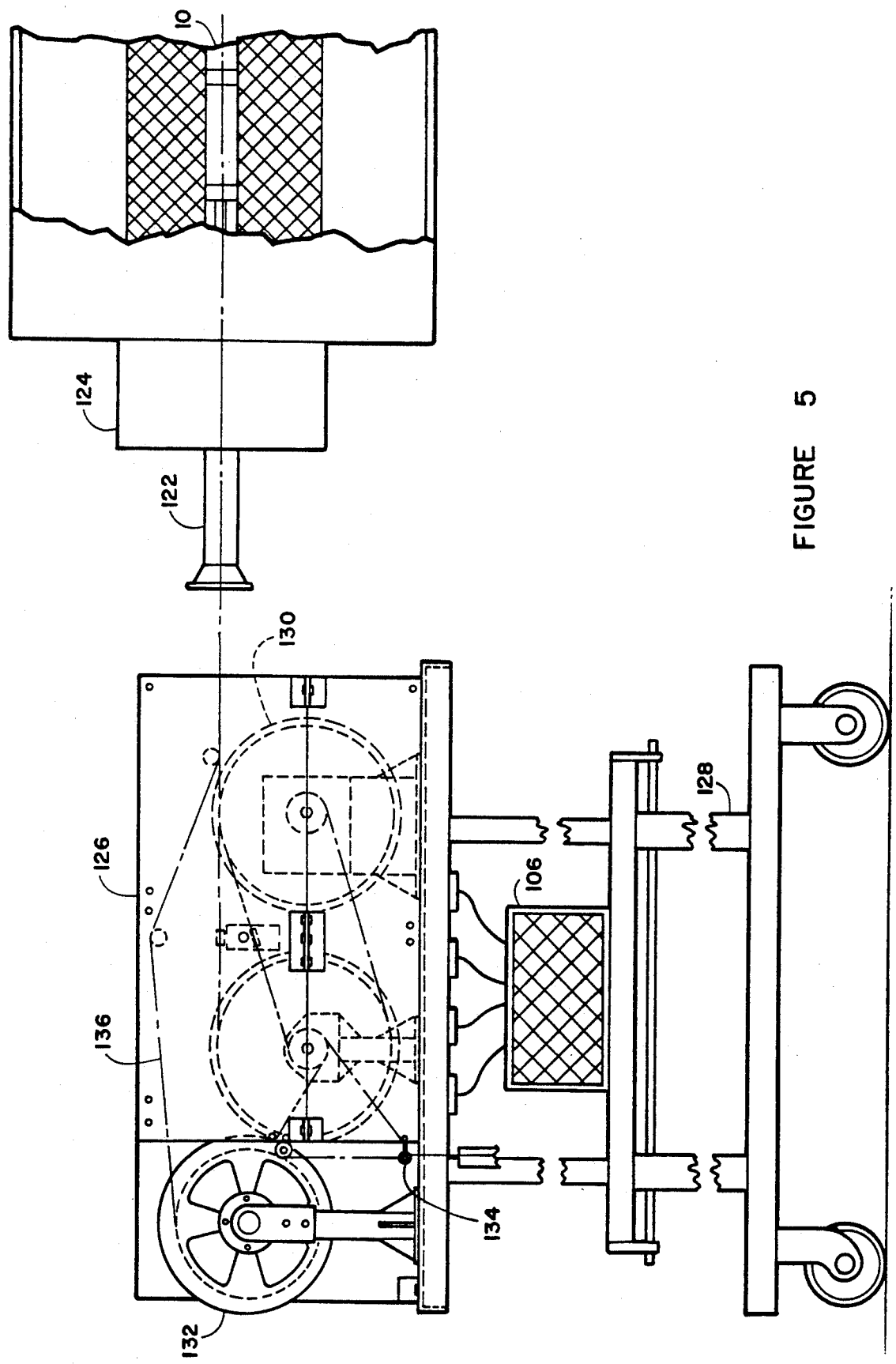
FIG. 5 is a diagrammatic representation of the take-up reel assembly which controls the fluid pressure lines and the electronic coaxial cable extending to the shuttle and further illustrates the general overall arrangement as it is used to measure the field angle of a magnetic field within a magnet bore tube.
Figure 6:
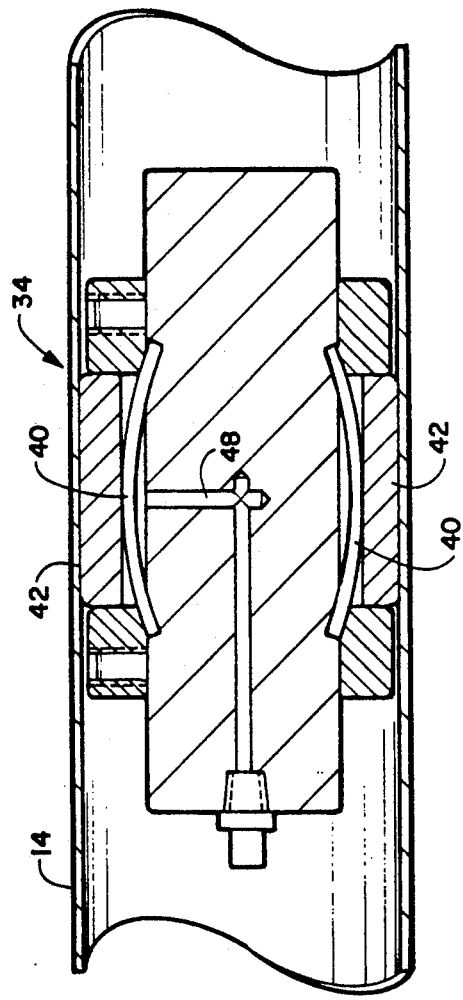
FIG. 6 is a fragmentary section which shows further detail of a cuff means of the invention.
Figure 7:
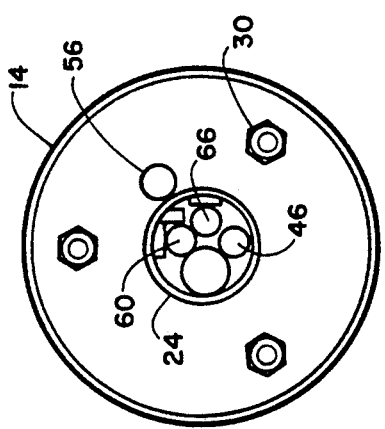
FIG. 7 is an end view of the arrangement of the present invention and illustrates the supply of pressurized fluid to various portions of the arrangement.

Referring now to the drawings in detail, and in particular to FIG. 1, reference character 10 generally illustrates a positioning shuttle constructed in accordance with a preferred embodiment of the present invention. It is to be understood that the shuttle 10 is constructed entirely of non-magnetic materials. The shuttle 10 is intended to be positioned within the magnet bore tube of the SSC. The in-tube shuttle 10 carries at its forward end a suitable electrical gauge 12 to measure magnetic field angle as a function of axial position in each of the magnets. The shuttle 10 includes an extensible body assembly 14 that includes a piston assembly 16 that is responsive to the selective application of pressurized fluid to extend the body assembly 14 as will be hereinafter described.

The body assembly 14 includes a tube section 18 which is made from an advanced organic composite such as by filament winding. The outer diameter of the tube section 18 is less than the interior diameter of the magnet bore tube which in the instance of the SSC is approximately 4.00 cm. It will be understood that the diameter of the tube section 18 is chosen so that it will easily slidably fit within a bore tube without binding.

Similarly, the diameter of the tube section 18 would not wish to be too small since that could cause a looseness within the tube that could make accurate readings somewhat more difficult to achieve. Preferably, the inside and outside of the tube section 18 are suitable coated with a lubricous material such as, Teflon or the like, for lubrication purposes and to reduce sliding friction of the shuttle 10.

The tube section 18 is closed at one end with a suitable cap member 20 and at its opposing end by a suitable cap member 22. Extending longitudinally through body assembly 14 is an elongated central tube 24 which is closely engaged by the end caps 20 and 22. The end caps 20 and 22 may by provided with suitable interior sealing means, such as O-rings, for contact with the tube 24 to prevent fluid leakage. The purposes of the tube 24 will become more evident in the ensuing description.

A piston assembly 16 disposed interiorly of the body section 14 includes a piston 26 provided with inner and outer seal means 28 and 30 is slidably disposed upon the tube section 24 and within the body 18. The piston 26 has a plurality of longitudinally extending rod members 31 which are connected to it and that extend through appropriate apertures 32 in the end cap 20. Suitable seal means are provided in each aperture 32 to sealing engage each rod member 31 and preclude fluid leakage therebetween.

The positioning shuttle 10 has a first cuff means 34 that is connected to the body 14 and a second cuff mean 36 that is connected to the piston assembly 16. In FIG. 1 it is seen that the first cuff means 34 includes an annular cuff body 38 that is secured to the end cap 22. The annular cuff body 38 is provided with an annular inflatable membrane 40 to which are secured a plurality of annular grip shoes 42. When the annular membrane 40 is inflated by the application of internal fluid pressure, the attached grip shoes 42 are urged outwardly into gripping engagement with the magnet bore tube. The fluid pressure for the expandable membrane 40 is supplied through a suitable fluid supply line 46 which receives pressurized fluid from a controllable fluid source, not shown in this Figure. The fluid supply line 46 extends through the central tube 24 and connects to a suitable port 48 that communicates with the membrane 40 for selective inflation of the membrane 40.

As previously noted, the piston assembly 16 is connected to a second cuff means 36. This arrangement includes the longitudinally extending rod members 31 which are suitably secured to an end portion 48 of an annular body member 50 which surrounds the central tube 24 and supports the second cuff means 36. The body member 50 is coated with TEFLON and is sized similarly to the body member 38 that supports the first cuff means 34. As before, the cuff means 36 includes an inflatable membrane 52 that is provided on its outer periphery with a plurality of annular grip shoes 54 that are shaped to grippingly engage the inner surface of the magnet bore tube. A suitable fluid supply line 56 extends into the central tube 24 of the shuttle 10. A port 58 provides communication between the supply line 56 and the inflatable cuff membrane 52 for selective supply of pressurized supply of fluid to the inflatable cuff 36.

In order to provide selective movement of the piston assembly 16 of the shuttle 10, a suitable supply line 60 extends through the central tube 24 and communicates through a port 62 with the space 64 that exists within the tube section 18 in front of the top of the piston 26, which space may be termed the front compartment.

Another supply line 66 also extends through the central tube 24 and communicates with the opposing face of the piston 26 through port 68 when the piston 26 has been driven to the position shown in FIG. 2 through selective application of pressurized fluid to the forward face of the piston 26. The space within the body 14 on this side of the piston may be termed the rear compartment.

The magnetic field alignment gauge 12 is connected to a suitable data acquisition means through a suitable coaxial cable 70 that extends through the central tube 24 of the shuttle 10 for connection with the gauge 12. Angular rotation of the shuttle 10 after it has been inserted in a magnet bore tube is minimized by precision fabrication during assembly. A suitable means, such as an electrolytic bubble level 71, attached to the shuttle 10 senses any deviation of the shuttle from the horizontal and outputs the status by a electronic sign of a control computer for constant monitoring of the data acquisition process as the shuttle 10 proceeds through the bore tube. Deviation beyond the specified tolerance is indicated on the display of the control computer.

Referring now to FIG. 3, a simplified diagrammatic representation is shown of the arrangement which provides control of the supply of fluid to the shuttle 10 through supply lines 46, 56, 60 and 66. A suitable supply 69 of a pressurized fluid, such as nitrogen, is supplied through a suitable pressure regulator 70 to a first supply line 72 that branches into a first branch 74 to a suitable valve 76. The valve 76 is connected through line 46 to the port 62 (not shown) to the front face of the piston 26 of the piston assembly 16. The supply line 72 is also connected through branch 80 to a suitable valve 82. The valve 82 is connected through a suitable line 66 to port 68 (not shown) on the opposing side of the piston 26. The source 69 of pressurized fluid is also connected through a pressure regulator 86 that is connected to a supply line 88 having one branch 90 connected to valve 92. The valve 92 is connected through supply line 46 to the port 48 (not shown) which provides communication of the pressurized fluid to the first cuff means 34. The supply line 88 has another branch 96 connected to valve 98 that in turn is connected through a supply line 56 to the port 58 which provides communication of pressurized fluid to the second inflatable cuff means 36.

The supply of pressurized fluid to the shuttle 10 for controlled movement thereof within the magnet bore tube is provided by the plurality of miniature solenoid controlled valves 76, 82, 92 and 98. Each valve has two independent solenoids which control the inlet and exhaust fluid. This provides substantial control over the pressurization and exhaust timing of each component. A further adjustment on each valve is a needle valve which can be adjusted to throttle the rate of the exhaust fluid. This provides for smoother forward and reverse movement of the shuttle 10, which is critical given the delicate nature of the field alignment gauge 12. Valves which are suitable for this purpose are Mark I valves made by NUMATICS of the type Model AASAS4-41E013A-24VDC, which valves are operable on 24 vdc.

A simplified block diagram of the computerized control system of the present invention for the purpose of controlling the movement of the shuttle 10 within the magnet bore tube and the acquisition of data by the magnet field alignment gauge 12 is seen in FIG. 4. A suitable IBM compatible host computer 102 is coupled through a RS-422 serial interface 104 to an LC2 programmable controller 106. The RS-422 serial interface is a well known off the shelf interface. The LC2 programmable controller is also a well known off the shelf component. The programmable controller 106 is coupled to a suitable digital control board 108 through cable 110. The digital control board 108 is a model PB4H made by OPT022. The digital control board 108 receives a plurality of solid state control relays 112 which control the solenoids of the series of four miniature solenoid-controlled air valves 76, 82, 92, and 98. The programmable controller 106 is coupled to an analog control board 114 through cable 116. The analog control board 114 is a model PB4AH made by OPT022. The analog control board 114 receives a suitable alignment gauge input module 118 and a suitable encoder input module 120. A software program is contained by the programmable computer 102 which contains the timing sequence to pressurize and depressurize the components of the shuttle 10 to produce forward and reverse movement. The control portion of the software is downloaded to a local controller 106 which processes the entire control sequence upon a command from the host computer 102. This frees the host computer 102 to perform data manipulation between probe data points.

Referring now to FIG. 5, the compact utility system to manage the air lines and instrumentation cables for the shuttle 10 as the shuttle 10 moves along the beam tube, which in the instance of the SSC, is 16.3 meter long will be illustrated. The magnet beam tube 122 which is surrounded by the cold mass 124 receives the shuttle 10. The shuttle 10 has attached to it the plurality of air lines and instrumentation cables. Constant tension must be maintained on the supply lines during the entire range of the shuttle 10 travel. This tension is maintained by the take-up reel assembly generally indicated by reference character 126. One purpose of the take up reel system 126 is to eliminate slip rings which are electrically too noisy for this application.

The take-up reel assembly 126 is preferably mounted upon a suitable cart 128 which also receives the data acquisition and control system illustrated in FIG. 4. The constant tension on the supply lines 46, 56, 60 and 66 is maintained during the entire range of shuttle 10 travel by connecting the output reel 130 to a constant-speed gear motor (not shown) through an adjustable particle clutch (not shown) at a predetermined tension which in the present instance is preferably 0.69 kg. of tension. A series of reels shown generally as 132 with different diameters achieves a step-down ratio of 125:1 so that the connecting ends of the supply lines 46, 56, 60, and 66 move less that 14 cm. throughout the entire 16.3 meters of shuttle 10 travel. It will be understood that suitable winding guides will be used to lay the cables and hoses down on the reel 130 with uniform spacing.

According to the presently preferred design of the invention, one sequence of events will move the shuttle 7.62 cm. An optically-encoded digital transducer 134 is used to maintain exact positioning of the shuttle 10 with the bore tube 122. Location of the shuttle 10 is determined by attaching a Kevlar cable 136136 from the transducer 134 to the shuttle 10. As the shuttle 10 moves through the beam tube 122, the cable 136 rotates a spring loaded shaft of the transducer 134 coupled to rotary digital encoder of the transducer 134. Digital pulses from the transducer at the rate of 246 per cm. of shuttle travel are output to the control computer 102. The computer 102 will determine when a desired location has been reached and a command will then be sent to the solenoid valves 76, 82, 92, and 98 to pressurize a cuff means.

For further ease of understanding of the invention, one control sequence to advance the shuttle 10 will be set forth. The first step is to pressurize the rear cuff 36 which results in the rear cuff means 36 expanding to contact the beam tube 122 with a gripping action and thereby preclude any backward movement of the shuttle 10. The next step is to exhaust the front cuff means 34 whereby the front cuff means 34 retracts from gripping action with the wall of the beam tube 122. The following step is to pressurize the front compartment 64 in front of the piston 26. The pressurized gas enters the compartment 64 which would cause the shuttle 10 to extend axially. However, because the exhaust valve controlling the compartment behind the piston 26 is closed the shuttle 10 does not move.

The next step is to exhaust the rear compartment. The exhaust valve on the rear piston compartment opens, which allows the pressurized fluid to escape. As the pressurized fluid escapes from the rear compartment, pressurized fluid is allowed to enter the front compartment thereby causing the shuttle to extend axially. The exhaust fluid passes through a needle valve which is partially closed to slow the rate of exhaust. This provides for a gentle controlled expansion of the shuttle 10. Next the front cuff means 34 is pressurized. The front cuff means 34 expands and grips the beam tube 124 which ceases forward movement of the shuttle 10.

The rear cuff means 36 is then exhausted. When the rear cuff means 36 retracts it releases its gripping hold on the beam tube 122. The next step is to pressurize the rear compartment. When fluid enters the rear compartment it would tend to cause the shuttle 10 to contract axially. However, since pressure still exists in the front compartment the device is held stationary. The front compartment is then exhausted. The exhaust on the front compartment is opened to allow the pressurized the pressurized fluid to enter the rear compartment thereby causing the shuttle 10 to contract axially. As the shuttle 10 is gripped within the beam tube 122 by the front cuff means 34, the rear body section 50 is brought forward. Again, the rate of exhaust is controlled to provide gentle movement of the shuttle 10.

In the automated system of the present invention, the programmable controller 106 controlling the movement of the shuttle 10 includes a module designed to receive analog input signals from the field alignment gauge 12. The measurements from the gauge are then sent to the computer 102 via the RS-422 serial interface. Each time the shuttle 10 reaches a position along the beam tube length where a measurement is to be made, the computer 102 commands the analog input module to begin taking measurements at the rate of 80 readings per second. The computer 102 stores the readings over a specified period of time, and records the deviation of the shuttle 10 from the horizontal. As the shuttle 10 begins to travel to the next position, the computer averages the vertical field readings and corrects for horizontal offset of the shuttle 10. The exact axial position of the measured deviation from horizontal of the shuttle 10, the averaged vertical tilt of the field alignment gauge 12, and the averaged vertical tilt corrected for the shuttle 10 deviation are stored in a data file. At the next measurement position another sequence of data-taking begins. Hence, an on-line measurement is automatically made, computed, and stored for each point along the beam tube 122 length. When the shuttle 10 reaches the end of the beam tube 122 length, a finished data file exists which contains both the raw and corrected data for the measurements.

Two passes are made through each SSC magnet to compensate for the zero offset in the calibration of the field alignment gauge. The second pass is made through the beam tube with the probe pointing toward the opposite end of the magnet, to produce symmetric vertical tilt profiles. Again, correct axial positioning is controlled through the digital position transducer output.

Many changes may be made in details of the instant invention, in the method and materials of fabrication, in the configuration and assemblage of the constituent elements, without departing from the spirit and scope of the appended claims, which changes are intended to be embraced therewithin.

Having thus described the invention, what is claimed as new and useful and desired to be secured by United States Letters Patent is:

1. An arrangement for measuring the field angle of a magnetic field as a function of axial position within a magnet bore tube which comprises;
   a magnet field alignment gauge;
   positioning means controllable by fluid pressure to position the gauge at predetermined axial positions within a magnet bore tube;
   fluid pressure means to provide controllable fluid pressure to the positioning means to cause the positioning means to move axially within the magnet bore tube;
   said positioning means includes a body means containing a piston assembly that is responsive to fluid pressure applied by said fluid pressure means to axially position the positioning means within the magnet bore tube at predetermined axial positions; and
   electronic computer means to provide determined signals to the fluid pressure means to cause it to generate predetermined fluid pressures.

2. The arrangement of claim 1 wherein the positioning means further includes a cuff means that cooperates with the piston assembly and which is selectively inflatable to position the positioning means within the magnet bore tube.

3. The arrangement of claim 2 wherein the magnet field alignment gauge is coupled to the body means whereby selective actuation of the piston assembly in cooperation with selective actuation of the cuff means will enable the piston assembly to axially move the body means and coupled magnetic field alignment gauge axially within the magnet bore tube to a predetermined position.

4. The arrangement of claim 3, wherein the cuff means includes a first cuff means carried by the body means of the positioning means and a second cuff means coupled to the piston assembly whereby selective actuation of one of the cuff means and the piston assembly will cause predetermined axial movement of the positioning means within the magnet bore tube.

5. The arrangement of claim 4 wherein the piston assembly includes a piston slidably positioned within a closed compartment of the body means, said piston being provided with longitudinally extending member means which are coupled to the second cuff means.

6. The arrangement of claim 5 wherein the longitudinally extending member means of the piston assembly slidably extend through an end of the compartment of the body means for coupling to the second cuff means.

7. The arrangement of claim 6 wherein each cuff means includes a central inflatable membrane having a plurality of shoe members secured to its outer surface whereby inflation of the inflatable membrane by the introduction of fluid will urge the shoe members outwardly into gripping engagement with the interior of the magnet bore tube.

8. The arrangement of claim 7 wherein the shape of the shoes carried by the inflatable membrane of each inflatable cuff means is complementary to the shape of the interior of the magnet bore tube whereby inflation of the membrane to a predetermined pressure will urge the shoes into sufficient gripping engagement with the magnet bore tube to permit axial movement of the positioning means.

9. The arrangement of claim 8 wherein ports are provided in the closed compartment of either side of the piston whereby selective introduction of pressurized fluid into the compartment on a predetermined side of the piston while only one of the two cuff means is inflated will enable the piston to slide within the closed compartment of the body means and change the axial position of the positioning means to a predetermined axial position within the magnet bore tube.

10. The arrangement of claim 9 wherein the second cuff means is inflated and fluid pressure is introduced through a port to a side of the piston which will cause it and the coupled magnet field alignment gauge to slide axially within the magnet bore tube to a predetermined axial position.

11. The arrangement of claim 9 wherein only the first cuff means is inflated and fluid pressure is introduced through a port to the opposing side of the piston so that the piston is slid axially within the closed compartment of the body means and the second cuff means coupled to the piston is slid axially within the magnet bore tube to a predetermined axial position.

12. The arrangement of claim 1 wherein the magnet field alignment gauge is provided with means to maintain rotational stability of gauge as it is axially advanced within the magnet bore tube by the positioning means is predetermined increments.

13. The arrangement of claim 1 wherein the means to provide controllable fluid pressures to the positioning means includes a source of pressurized fluid located exteriorly to the magnet bore tube and a plurality of supply lines which connect the pressurized fluid source to the positioning means.

14. The arrangement of claim 13 wherein the positioning means further includes a first cuff means that cooperates with the piston assembly and which is selectively inflatable to position the positioning means within the magnet bore tube, the positioning means includes a body means containing a piston assembly that is responsive to fluid pressure applied by the fluid pressure means to axially position the positioning means within the magnet bore tube at predetermined axial positions, the piston assembly includes a piston slidably positioned within a closed compartment of the body means, said piston being provided with longitudinally extending member means which are coupled to a second cuff means and the means to provide controllable fluid pressures to the positioning means includes a plurality of controllable valves which may be selectively actuated to selectively supply pressurized fluid to said first and second cuff means and to the closed compartment containing the slidable piston whereby the positioning means may be moved axially within the magnet bore tube in a predetermined axial direction.

15. The arrangement of claim 14 wherein the electronic computer means includes an electrical control means for each controllable valve whereby each of the two inflatable cuff means and the input of pressurized fluid into the closed compartment on one side of the slidable piston may be selectively controlled for controlled axial movement of the positioning means and the associated magnetic field alignment gauge within the magnet bore tube.

16. The arrangement of claim 15 wherein the electrical control means for each controllable valve is a solid state electronic relay.

17. The arrangement of claim 16 wherein the electronic computer means includes stored program means which are operable to provide predetermined electrical signal to the solid state relays for each controllable valve to operatively control the valves in a predetermined manner to cause the fluid pressures to cause the positioning means and associated magnetic field gauge to traverse the length of the magnetic bore tube in predetermined increments and to thereafter retrace its axial path within the tube to its original starting point.

18. The arrangement of claim 13 wherein a tether line is coupled to the positioning means and means is provided to accurately measure the axial extension of the tether line and associated positioning means within the magnet bore tube and to signal the fluid pressure means for selective control of the valves.

19. The arrangement of claim 18 wherein a transducer generates a signal indicative of the axial extension of the tether line and the resultant electrical signal is utilized to control the means provided to supply pressurized fluid to the positioning means.

* * * * *

UNITED STATES PATENT AND TRADEMARK OFFICE
CERTIFICATE OF CORRECTION

PATENT NO. : 5,228,351

DATED : 7/20/93

INVENTOR(S) : Stephen V. Pidcoe, et al

It is certified that error appears in the above-indentified patent and that said Letters Patent is hereby corrected as shown below:

Column 1, line 5, please insert the following:

--This invention was made with Government support under Contract No. DE-AC02-76CH0300, awarded by the United States Department of Energy. The Government has certain rights in the invention.--.

Signed and Sealed this

Fifth Day of April, 1994

Attest:

Attesting Officer

BRUCE LEHMAN

Commissioner of Patents and Trademarks

UNITED STATES PATENT AND TRADEMARK OFFICE
CERTIFICATE OF CORRECTION

PATENT NO. : 5,228,351
DATED : July 20, 1993
INVENTOR(S) : Stephen V. Pidcoe, et. al.

It is certified that error appears in the above-indentified patent and that said Letters Patent is hereby corrected as shown below:

On page, 1, column 1, after line 4, insert as follows:

"This invention was made with Government support under Contract No. DE-AC02-76CH03000, awarded by the United States Department of Energy. The Government has certain rights in the invention".

This Certificate supersedes Certificate of Correction issued April 5, 1994.

Signed and Sealed this

Thirty-first Day of May, 1994

Attest:

BRUCE LEHMAN

*Attesting Officer*      *Commissioner of Patents and Trademarks*